US012657138B2

(12) United States Patent
Segev et al.

(10) Patent No.: US 12,657,138 B2
(45) Date of Patent: Jun. 16, 2026

(54) COMMAND PROCESSING IN SEQUENTIAL WRITE REQUIRED ZONE

(71) Applicant: Sandisk Technologies, Inc., Milpitas, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/829,608

(22) Filed: Sep. 10, 2024

(65) Prior Publication Data

US 2026/0072853 A1    Mar. 12, 2026

(51) Int. Cl.
*G06F 13/16*          (2006.01)

(52) U.S. Cl.
CPC ...... *G06F 13/1642* (2013.01); *G06F 13/1673* (2013.01)

(58) Field of Classification Search
CPC .......................... G06F 13/1642; G06F 13/1673
USPC .......................................................... 711/154
See application file for complete search history.

(56) References Cited

U.S. PATENT DOCUMENTS

| | | | | | |
|---|---|---|---|---|---|
| 5,671,365 | A | * | 9/1997 | Binford | G06F 13/126 |
| | | | | | 710/263 |
| 5,941,970 | A | * | 8/1999 | Lange | G06F 13/4059 |
| | | | | | 710/52 |
| 6,697,849 | B1 | * | 2/2004 | Carlson | H04L 67/5682 |
| | | | | | 709/219 |

| | | | | | |
|---|---|---|---|---|---|
| 8,108,590 | B2 | * | 1/2012 | Chow | G06F 21/78 |
| | | | | | 711/E12.098 |
| 8,566,510 | B2 | * | 10/2013 | Weingarten | G06F 12/0246 |
| | | | | | 711/100 |
| 8,595,385 | B1 | | 11/2013 | Shapiro et al. | |
| 10,019,161 | B2 | | 7/2018 | Sharifie et al. | |
| 11,249,926 | B1 | * | 2/2022 | Han | G06F 13/24 |
| 11,294,827 | B2 | | 4/2022 | Bennett et al. | |
| 11,704,069 | B2 | | 7/2023 | Kanno et al. | |

(Continued)

FOREIGN PATENT DOCUMENTS

| | | | | | |
|---|---|---|---|---|---|
| CN | 112181285 | A | * | 1/2021 | ............. G06F 3/061 |
| JP | H1185661 | A | * | 3/1999 | |

OTHER PUBLICATIONS

Machine translation of CN 112181285 (Year: 2021).*
Machine translation of JP H11-85661 (Year: 1999).*
U.S. Appl. No. 63/419,411, filed Oct. 26, 2022.

*Primary Examiner* — Reginald G Bragdon
*Assistant Examiner* — Aaron D Ho
(74) *Attorney, Agent, or Firm* — Patterson + Sheridan, LLP

(57)          ABSTRACT

Commands can be placed in a shadow submission queue (SQ) that is invisible to a host device, and corresponding data can be placed in a temporary buffer. Upon executing any command, the shadow SQ is searched for any commands that can be executed. In so doing, sequential writing to a zone is possible for out of order fetched commands. To further increase granularity, the order can be on a per page basis within a zone such that commands can be taken out of order throughout the zone, but if a page can be filled, even if the page is out of order, the page can be written. In either the zone granularity or the page granularity situation, commands can be placed in the shadow SQ so long as there is sufficient storage available in the temporary buffer for both the data of the command and any gaps.

19 Claims, 11 Drawing Sheets

(56) References Cited

U.S. PATENT DOCUMENTS

| | | | |
|---|---|---|---|
| 2004/0123039 A1* | 6/2004 | Berks | G06F 12/0871 |
| | | | 711/133 |
| 2004/0199734 A1* | 10/2004 | Rajamani | G06F 9/526 |
| | | | 711/158 |
| 2008/0154934 A1* | 6/2008 | Lau | G06F 16/2228 |
| | | | 707/999.102 |
| 2009/0080428 A1* | 3/2009 | Witkowski | H04L 49/357 |
| | | | 370/392 |
| 2012/0151118 A1* | 6/2012 | Flynn | G06F 11/1666 |
| | | | 711/170 |
| 2012/0221810 A1* | 8/2012 | Shah | G06F 13/1642 |
| | | | 711/158 |
| 2015/0242131 A1* | 8/2015 | Nakamura | G06F 3/0659 |
| | | | 711/112 |
| 2019/0114350 A1* | 4/2019 | Shi | H04L 67/1097 |
| 2019/0278523 A1* | 9/2019 | Benisty | G06F 3/0658 |
| 2020/0192715 A1* | 6/2020 | Wang | G06F 9/5016 |
| 2021/0223994 A1* | 7/2021 | Kanno | G06F 3/0679 |
| 2022/0147276 A1* | 5/2022 | Watanabe | G06F 3/0604 |
| 2022/0317878 A1* | 10/2022 | Lin | G06F 3/0604 |
| 2022/0318157 A1* | 10/2022 | Hsu | G06F 3/0604 |
| 2023/0229358 A1 | 7/2023 | Xu et al. | |
| 2023/0289226 A1* | 9/2023 | Segev | G06F 9/546 |
| 2024/0111456 A1* | 4/2024 | Chen | G06F 3/0679 |
| 2024/0143509 A1* | 5/2024 | Sela | G06F 3/0644 |
| 2024/0168681 A1* | 5/2024 | Helmick | G06F 3/0679 |

* cited by examiner

700

| 702A | 702B | 702C | 702D | 702E | 702F | 702G | 702H | 702I | 702J |

710

| LBA3 704A | LBA4 704B | LBA5 704C | 702D | 702E | 702F | 702G | 702H | 702I | 702J |

720

| LBA3 704A | LBA4 704B | LBA5 704C | LBA6 706A | 702E | 702F | 702G | 702H | 702I | 702J |

COMMAND PROCESSING IN SEQUENTIAL WRITE REQUIRED ZONE

BACKGROUND OF THE DISCLOSURE

Field of the Disclosure

Embodiments of the present disclosure generally relate to improving the sequential write required (SWR) zone model.

Description of the Related Art

In zone storage architecture, in the sequential write required (SWR) zone model, the host device is required to write to the data storage device in a sequential manner. To maintain maximum performance, host devices need to send multiple commands to the data storage device in order to fill the system pipelines (both host device and data storage device pipelines). However, it is hard to fill the system pipelines with the limitation that all write commands for a specific zone must be sequential. Race conditions in the host queues or errors in data transfer of commands may prevent commands from arriving to the data storage device in the correct sequential order.

When the commands arrive out of order, according to the SWR model, commands must be rejected by the data storage device if not sequential. In this case, all the commands in the device queue which are targeting the zone for which a first command was missed would be considered as error commands since the error command's corresponding LBA would not match the expected write pointer (WP) value for the zone. The rest of the commands in the queue will not be considered sequential. The situation would result in inefficient behavior of the zone storage device. More specifically, there is a low adaptation rate for the SWR zone model. The problem exists in both non-volatile memory express (NVMe) and universal flash storage (UFS) swim lanes.

Therefore, there is a need in the art for an improved SWR zone model.

SUMMARY OF THE DISCLOSURE

Commands can be placed in a shadow submission queue (SQ) that is invisible to a host device, and corresponding data can be placed in a temporary buffer. Upon executing any command, the shadow SQ is searched for any commands that can be executed. In so doing, sequential writing to a zone is possible for out of order fetched commands. To further increase granularity, the order can be on a per page basis within a zone such that commands can be taken out of order throughout the zone, but if a page can be filled, even if the page is out of order, the page can be written. In either the zone granularity or the page granularity situation, commands can be placed in the shadow SQ so long as there is sufficient storage available in the temporary buffer for both the data of the command and any gaps.

In one embodiment, a data storage device comprises: a memory device; and a controller coupled to the memory device, wherein the controller is configured to: fetch a first command from a first submission queue (SQ); execute the first command and adjust a write zone pointer to a head of a zone; fetch a second command from the first SQ; determine that the second command is not at the head of the zone; place the second command in a shadow SQ; fetch a third command from the first SQ; determine that the third command is at the head of the zone; execute the third command and adjust the head of the zone to a new head of the zone;

fetch the second command from the shadow SQ; determine that the second command is at the new head of the zone; and execute the second command.

In another embodiment, a data storage device comprises: a memory device; and a controller coupled to the memory device, wherein the controller is configured to: create at least one zone within the memory device, wherein the at least one zone comprises a plurality of pages; maintain a shadow submission queue (SQ) for each zone of the at least one zone; and determine whether there is sufficient room in a temporary buffer for data corresponding to a command to be placed and for data that fills a gap of a page not associated with the command.

In another embodiment, a data storage device comprises: means to store data; and a controller coupled to the means to store data, wherein the controller is configured to: reorder commands on a per zone or per page per zone basis, wherein the reordering occurs by placing commands in a shadow submission queue (SQ) dedicated and managed per zone, and wherein the reordering occurs by searching the shadow SQ after executing commands from either a host SQ or the shadow SQ and re-queueing commands in the shadow SQ not selected for execution.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Commands can be placed in a shadow submission queue (SQ) that is invisible to a host device, and corresponding data can be placed in a temporary buffer. Upon executing any command, the shadow SQ is searched for any commands that can be executed. In so doing, sequential writing to a zone is possible for out of order fetched commands. To further increase granularity, the order can be on a per page basis within a zone such that commands can be taken out of order throughout the zone, but if a page can be filled, even if the page is out of order, the page can be written. In either the zone granularity or the page granularity situation, commands can be placed in the shadow SQ so long as there is sufficient storage available in the temporary buffer for both the data of the command and any gaps.

Figure 1:
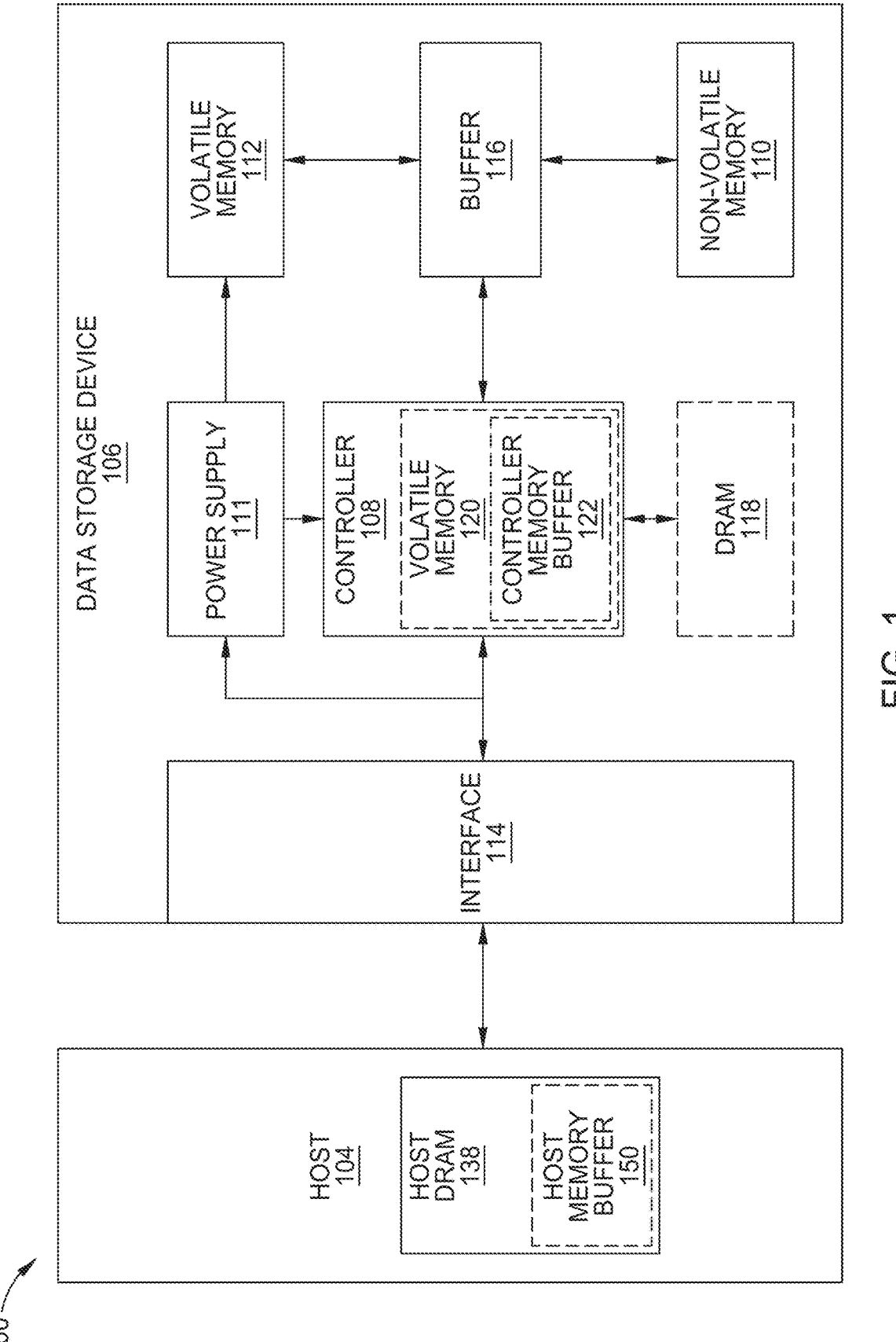
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
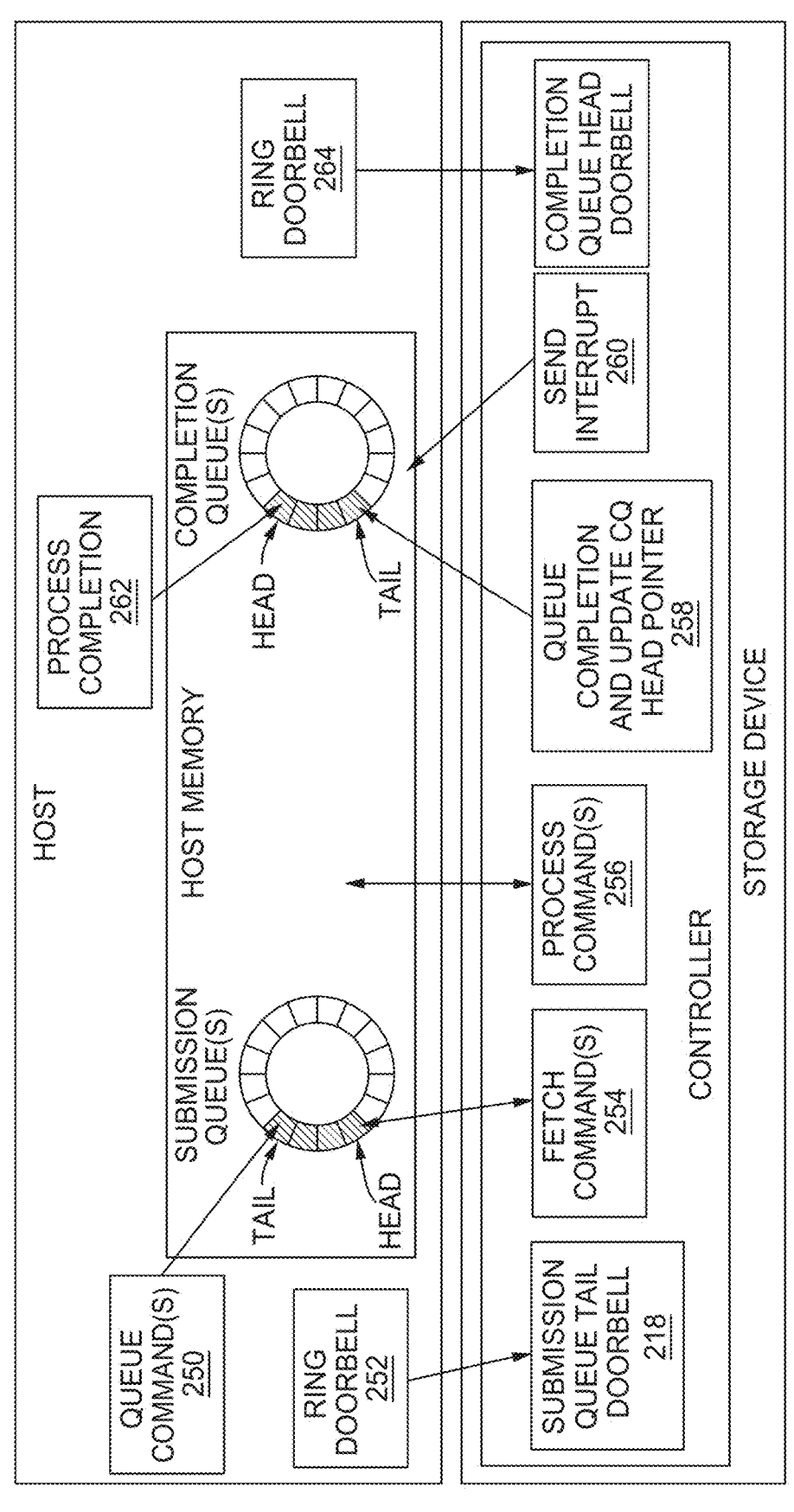
FIG. 2 is a block diagram illustrating a method of operating a storage device to execute a read or write command, according to one or more embodiments.

FIG. 2 is a block diagram illustrating a method 200 of operating a storage device to execute a read or write command, according to one embodiment. Method 200 may be used with the storage system 100 having a host device 104 and a data storage device 106 comprising a controller 108. Method 200 may be used with a host device and a storage device comprising a command processor.

Method 200 begins at operation 250, where the host device writes a command into a submission queue as an entry. The host device may write one or more commands into the submission queue at operation 250. The commands may be read commands or write commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The doorbell signal may be the doorbell 218 of FIG. 2. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives or direct memory access (DMA) reads the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBAs) of the zone, and advancing a write pointer of the zone to identify the next available LBA within the zone.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

To deal with the SWR zone model out of order issue, one approach is to use low queue depth where the host device works with a queue depth of one (per zone) to ensure commands are executed in order. Another option is high queue depth where all commands in the queue which are not sequential and do not meet the SWR model are rejected.

The SWR zone model bottleneck can be opened by reordering commands, per zone, per page. The reordering will be done by pushing commands into device managed SQs which are managed by the controller per-zone. Thereafter, performing fetches from those SQs. As programing the memory device (e.g., NAND) is done per page, it is acceptable to wait for a full page even if there is a gap prior to the page. One section below refers to the method of re-ordering commands per zone. Another section adds the per-page granularity.

Figure 3:
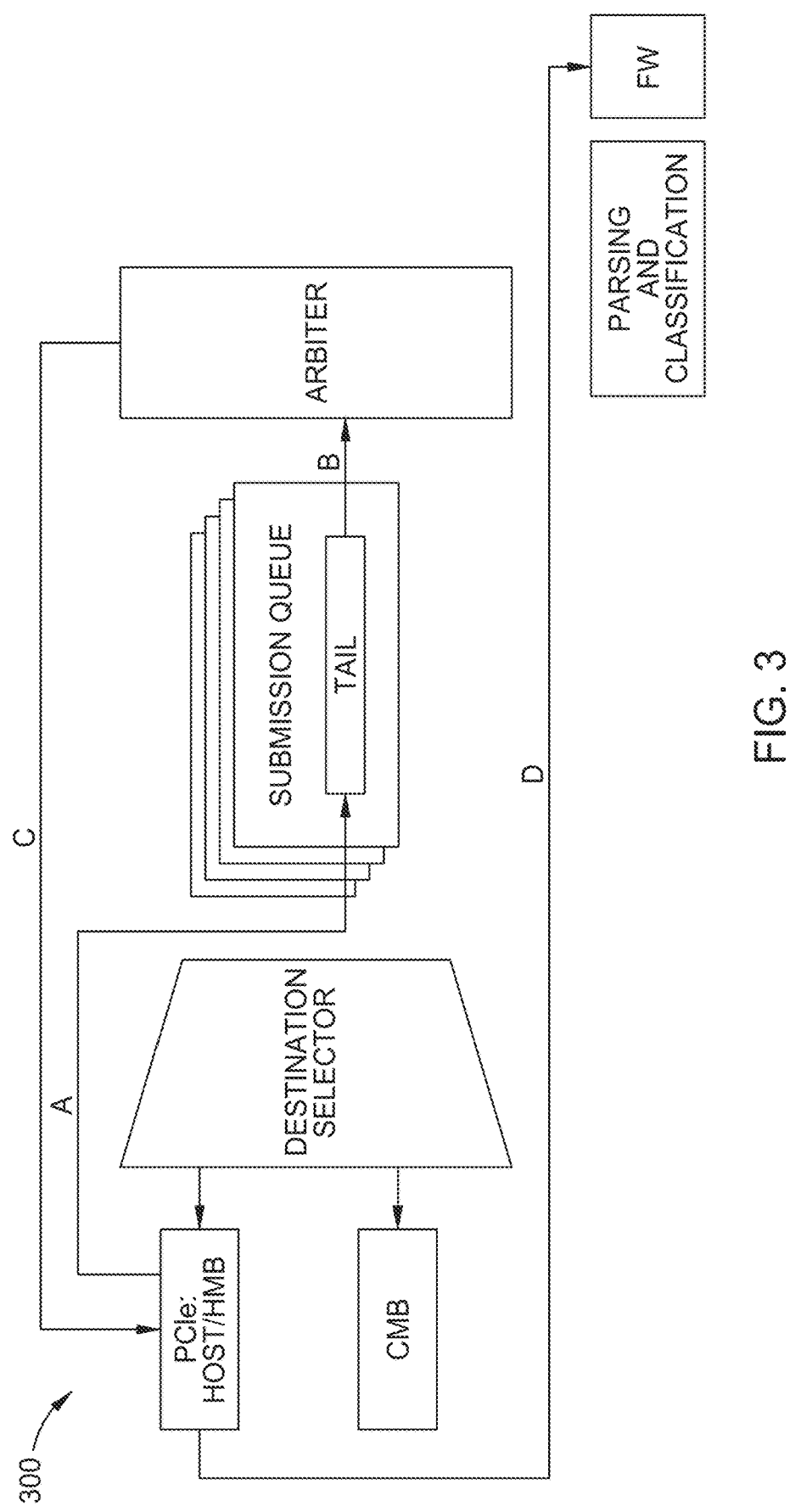
FIG. 3 is a schematic illustration of command arrival flow according to one embodiment.

FIG. 3 is a schematic illustration 300 of command arrival flow according to one embodiment. The illustration 300 shows a typical SSD-NVMe device command fetching path. There are several paths, A-D, illustrated. For path A, the host device performs a doorbell to any SQ to which the host device selects, by writing the new tail value. For path B, the arbiter is informed of all pending doorbells so that the arbiter can select which SQ to service next. For path C, the arbiter reads the command from the host device DRAM. The selected SQ in the DRAM could instead reside in the CMB range if CMB is present. A destination selector is used to send the fetching request to either PCIe or the local DRAM (i.e., CMB). For path D, the host device (or CMB) provides back the command itself, which goes through parsing and classification before the command is executed. As part of the execution, the firmware (FW), or any dedicated hardware (HW) block, should check to determine whether the write command arrives to the head of the zone. If yes, the command should be executed. If no, the command should not be executed and could be failed, for example. The proposed solution holds minimal impact to existing HW flows/automation.

Broadly speaking, whenever a write command arrives that is not for the write zone pointer, the command is pushed to a virtual or shadow SQ. Later, when a command arrives to the correct write zone pointers, commands will be fetched from the virtual SQ to check if any commands match the new write zone pointer. Any commands in the virtual SQ that do not match will return to the virtual SQ. Scanning the virtual SQ will continue until the virtual SQ is either empty, or when a full scan is completed, but no match is found.

In order to implement the embodiments, the number of SQs is increased by the number of open zones. For example, if there are 512 host SQs and 128 zones, then there will be 128 virtual SQs (oftentimes referred to as shadow SQs or zone SQs) such that the total number of SQs is 640. The new SQ location may be in the HMB or in the same component (but out of the range) as CMB, when supported. The additional SQs will be invisible to the host device.

Figure 4:
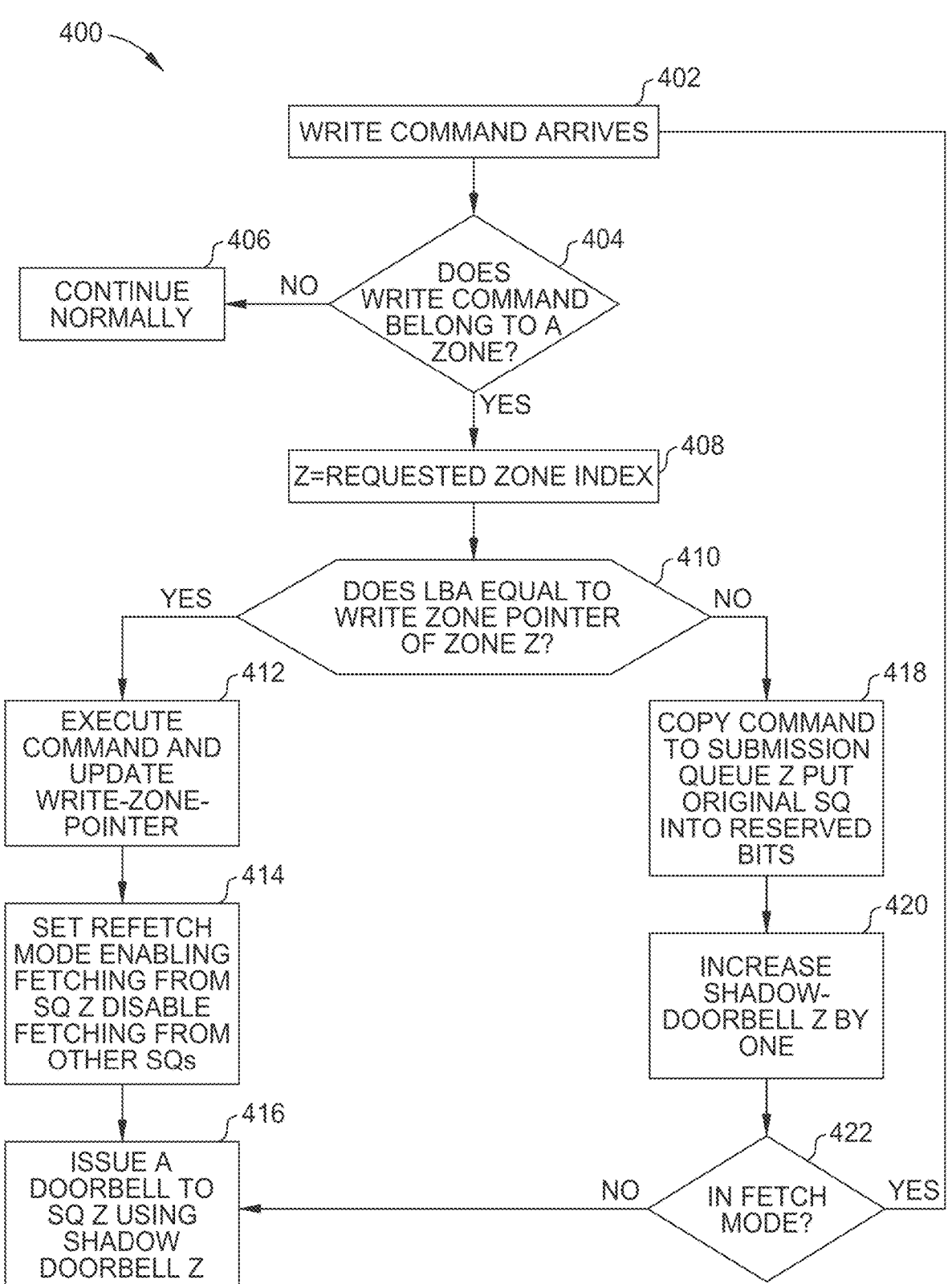
FIG. 4 is a flowchart illustrating command processing according to one embodiment.

Changes in FW flow upon getting a write command to a zone namespace as shown in FIG. 4 which is a flowchart 400 illustrating command processing according to one embodiment. The process starts by detecting that a write command has arrived at block 402. The controller determines whether the write command is a zoned write command at block 404. If the write command is not a zoned write command, than the flow continues normally at block 406. If the write command is a zoned write command, then the zone index "Z" is checked at block 408.

Next, a determination is made regarding whether the write command is a command to the head of the zone (i.e., zone write pointer) as block 410. If the write command is not to the head of the zone, than the command is copied to SQ Z (i.e., the virtual SQ), which resides in HMB (or CMB) at block 418. Additionally, the original SQ index is saved in reserved bits of the write command. Thereafter, a copy of the tail doorbell of SQ Z is increased by one at block 420, but the doorbell is not yet rung. A determination is then made at block 422 regarding whether the data storage device is operating in re-fetch mode. If operating in re-fetch mode, then the process proceeds back to block 402 meaning the commands are from SQ Z, and the doorbell is not rung. However if not in re-fetch mode, than the write command is a new command that is added to SQ Z, and the doorbell is rung at block 416.

If the command is the head of the zone as determined at block 410, then the command is executed at block 412 and the write-zone-pointer is updated by incrementing the write-zone-pointer by the command length. Then re-fetch mode is set since there is a need to scan SQ Z for any previously fetched commands that matches the new write-zone-pointer and fetching only from SQ Z is enabled for the same reason at block 414. Thereafter, a doorbell equal to the shadow register is issued at block 416. Block 416 ensures that if the controller previously scanned (i.e., re-fetched) commands from SQ Z, which did not match the write zone pointer, yet now there is a new match and write zone pointer advanced, SQ Z needs to be re-scanned.

Figure 5:
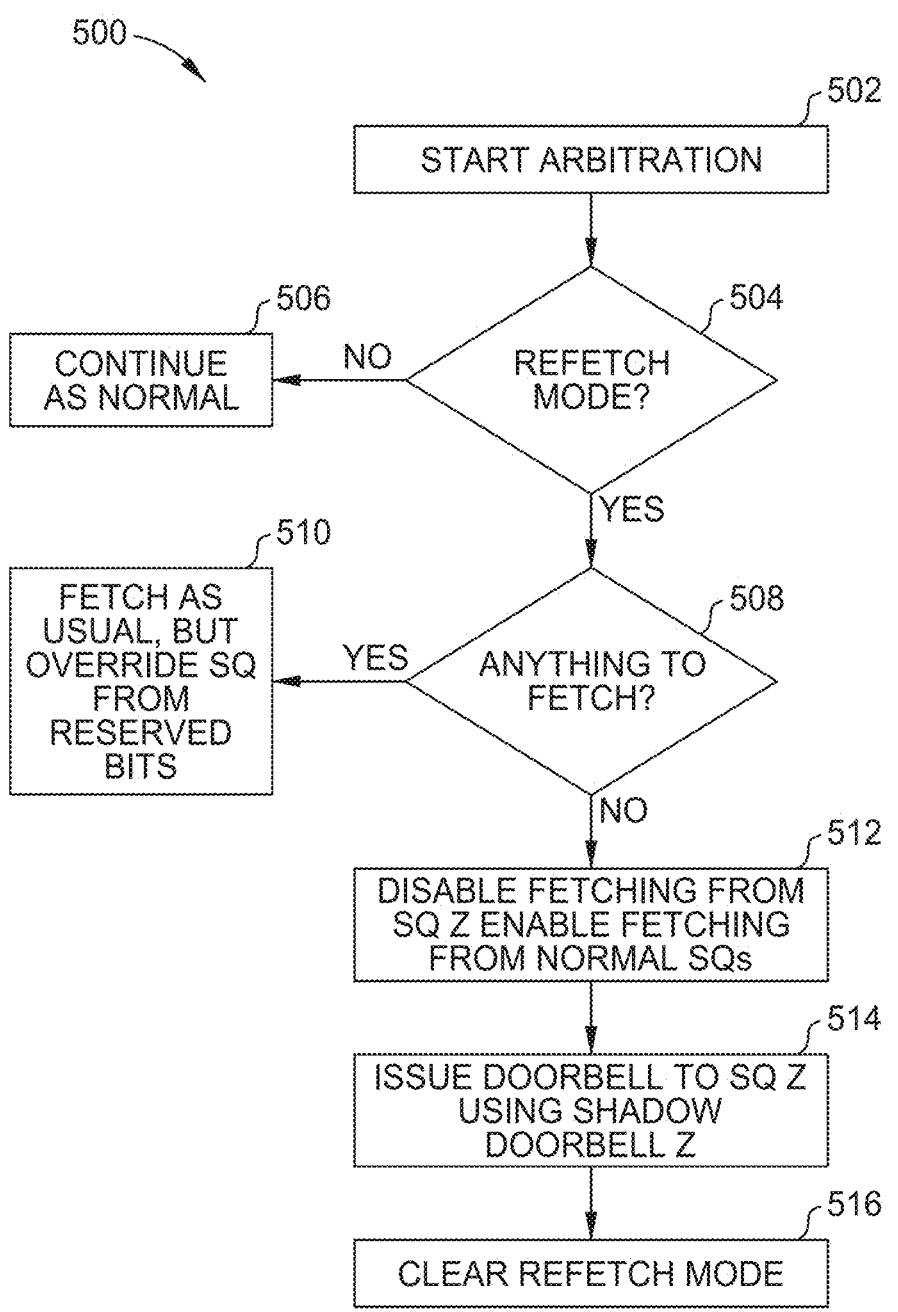
FIG. 5 is a flowchart illustrating arbitration and parsing according to one embodiment.

FIG. 5 is a flowchart 500 illustrating arbitration and parsing according to one embodiment. Whenever the arbiter needs to arbitrate it starts at block 502 and checks if the data storage device is in re-fetch mode at block 504. If the data storage device is not in re-fetch mode, then the data storage device continues to operate as usual at block 506. However, if the data storage device is in re-fetch mode, then the data storage device will further check at block 508 whether there is anything in SQ Z to fetch. If there is something to fetch from SQ Z, then the data storage device fetches as usual at block 510, but the parser uses the reserved bits as the indication for the SQ (i.e., the original SQ).

However, if there is nothing to fetch (i.e., the data storage device is in re-fetch mode, but SQ Z is empty either because everything has already been re-fetched, and no new doorbell arrived, or SQ Z was empty to begin with), the FW is notified and the FW returns to fetching from normal SQs at block 512 followed by ringing the doorbell to SQ Z at block 514, as to re-queue the commands for the next time the data storage device goes into re-fetching mode. Finally, the re-fetching mode is cleared at block 516.

Consider the following example that comprises four commands: A, B, C, and D, each of 3 LBA in size, all belonging to the same zone (zone Z). Command A: LBA=0, size=3. Command B: LBA-3, size=3. Command C: LBA=6, size=3. Command D: LBA=9, size=3. Each of the commands is queued by the host device to a different SQ. For the example, assume the fetching order is: A, D, C, and then B. At the beginning, the write zone pointer=0, the shadow pointer=0, and re-fetch mode is disabled.

At step 1, command A arrives. Command A is executed and the write zone pointer is updated to equal 3 (i.e., increase the pointer by the size of command A). The FW enters pre-fetching mode and disables normal fetching. The arbiter can only fetch from SQ Z, but the arbiter is currently empty, so the arbiter updates FW. The FW re-enables normal fetching, and updates SQ Z with doorbell=0 (still empty).

At step 2, command D arrives. Command D is not at the head of zone (i.e., D.LBA>write-zone-pointer). Thus, command D is pushed to SQ Z, and the shadow pointer is incremented to 1. Because the controller is not in re-fetch mode, then the real doorbell of SQ Z is updated to the shadow pointer and is now set as 1.

At step 3, command C arrives. Command C is not at the head of zone (i.e., C.LBA>write-zone-pointer). Thus, command C is pushed to SQ Z, and the shadow pointer is incremented to 2. Because the controller is not in re-fetch mode, then the real doorbell of SQ Z gets updated to shadow pointer, and is now set as 2.

At step 4, command B arrives. Command B is executed because command B is at the head of zone (i.e., write-zone-pointer==B.LBA). The write zone pointer is updated and is now 6. The FW enters pre-fetching mode and disables normal fetching. The arbiter has two commands in SQ Z, so step 5 will now occur.

At step 5, re-fetching of command D happens. The arbiter fetches command D, but command D is not head-of-zone (i.e., D.LBA>write zone pointer). Command D is re-pushed to SQ Z, and the shadow pointer is now incremented to 3. Note however, that since command D was fetched and re-pushed to SQ Z, the size of SQ Z is now 2 entries/ commands. Because the controller is in re-fetch mode, there is no actual doorbell. However, there is another command to check in SQ Z.

At step 6, re-fetching of command C occurs. The arbiter fetches command C from SQ Z, and C.LBA=write zone pointer. Thus, command C is executed, and the write zone pointer is now updated to 9. Because command C is executed, a doorbell ring occurs to the shadow doorbell, so now SQ Z holds the value 3 for its tail pointer. It is to be noted that SQ Z now contains one command (i.e., command D), from pointer 2 to pointer 3. As noted above, Command D was re-sent to SQ Z in step 5.

At step 7, command D is re-fetched. The arbiter fetches command D from SQ Z, and D.LBA=write zone pointer. Thus, command D is executed, and the write-zone-pointer is now updated to 12. The FW stays in pre-fetching mode and disables normal fetching. The arbiter can only fetch from SQ Z, but SQ Z is currently empty, so the arbiter updates the FW. The FW re-enables normal fetching, and updates SQ Z with doorbell=3 (still empty) because the controller already fetched a total of three entries from SQ Z (D, C and D again).

Figure 6:
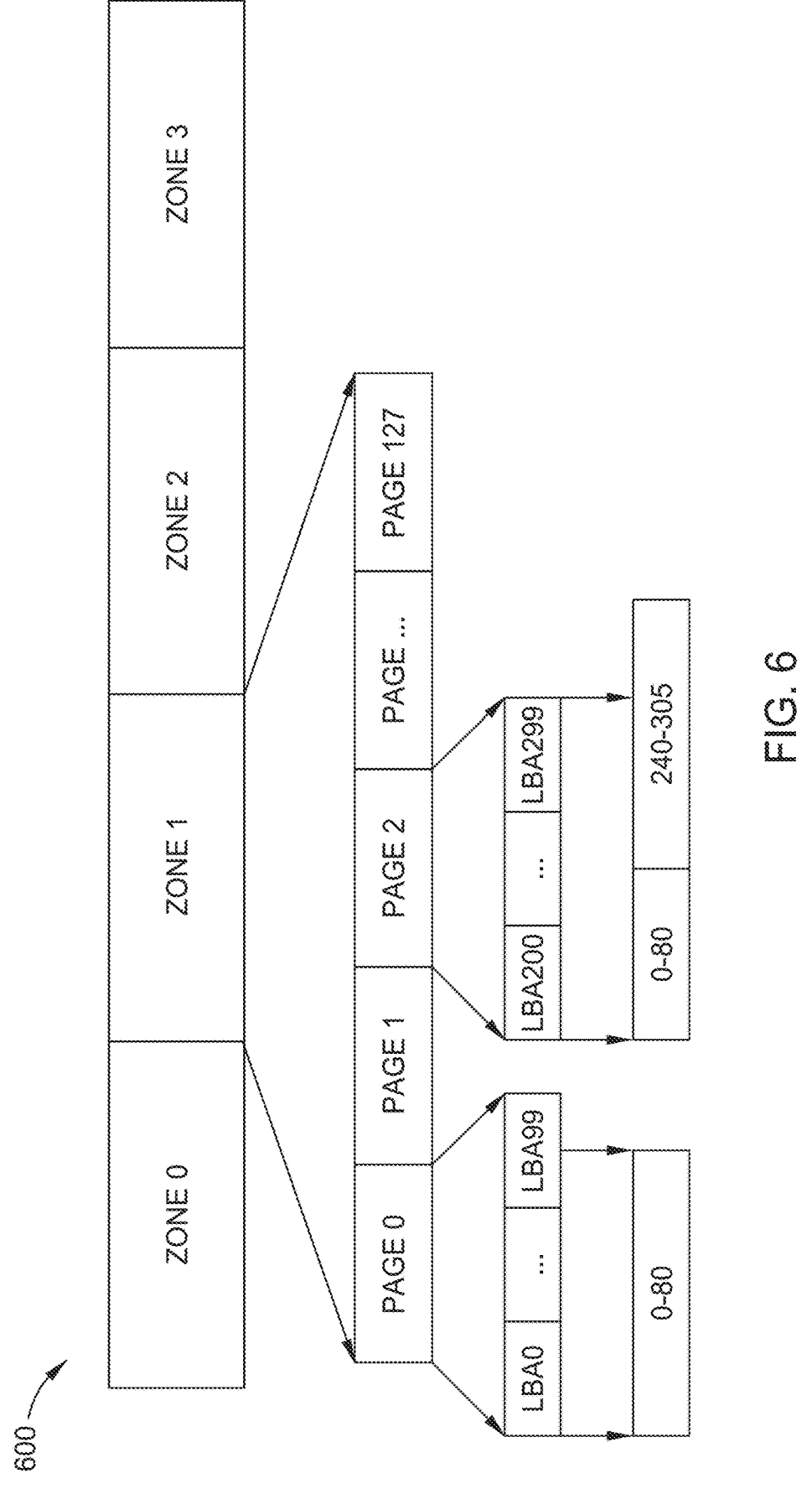
FIG. 6 is a schematic illustration of page based reordering according to one embodiment.

The first part discussed above referred to full re-ordering (per zone) based on zone. However, the second part involves further optimization on a per page granularity level. Writing the data in the zone in a sequential way can still be maintained in "parts", and the concept is explained in FIG. 6. FIG. 6 is a schematic illustration 600 of page based reordering according to one embodiment. The memory device of the data storage device in the example is split into four zones. Each zone is further split into 128 pages, where each page is the size that is programed as a single unit into the memory device (e.g., NAND). Each page is composed of 100 FMUs (LBA). It is to be noted that 100 is just for simplicity and in reality 100 FMUs could be 4 FMUs (16K) for SLC devices, 8 FMU for TLC devices, etc. The bottom line shows three commands: Command A: LBA 0 to 80; Command B: LBA 204-305; and Command C: LBA 200 to 204.

According to the full re-ordering explained in the first part, the data storage device will only execute the data transfer regarding to LBAs 0-80 because there is a gap (i.e., LBA 81-199) between LBA 80 and LBA 200. However, in the per-page granularity, commands B and C may be executed as well because collectively commands B and C contain a full page (i.e., page 2) that can be sent to the memory device (e.g., NAND) and release the relevant resources. The example leaves LBA 200-305 in a temporary buffer or cache, so before executing these commands, the data storage device needs to ensure the data storage device has enough reserved space to retain the over-head.

Figures 7A, 7B, 7C:
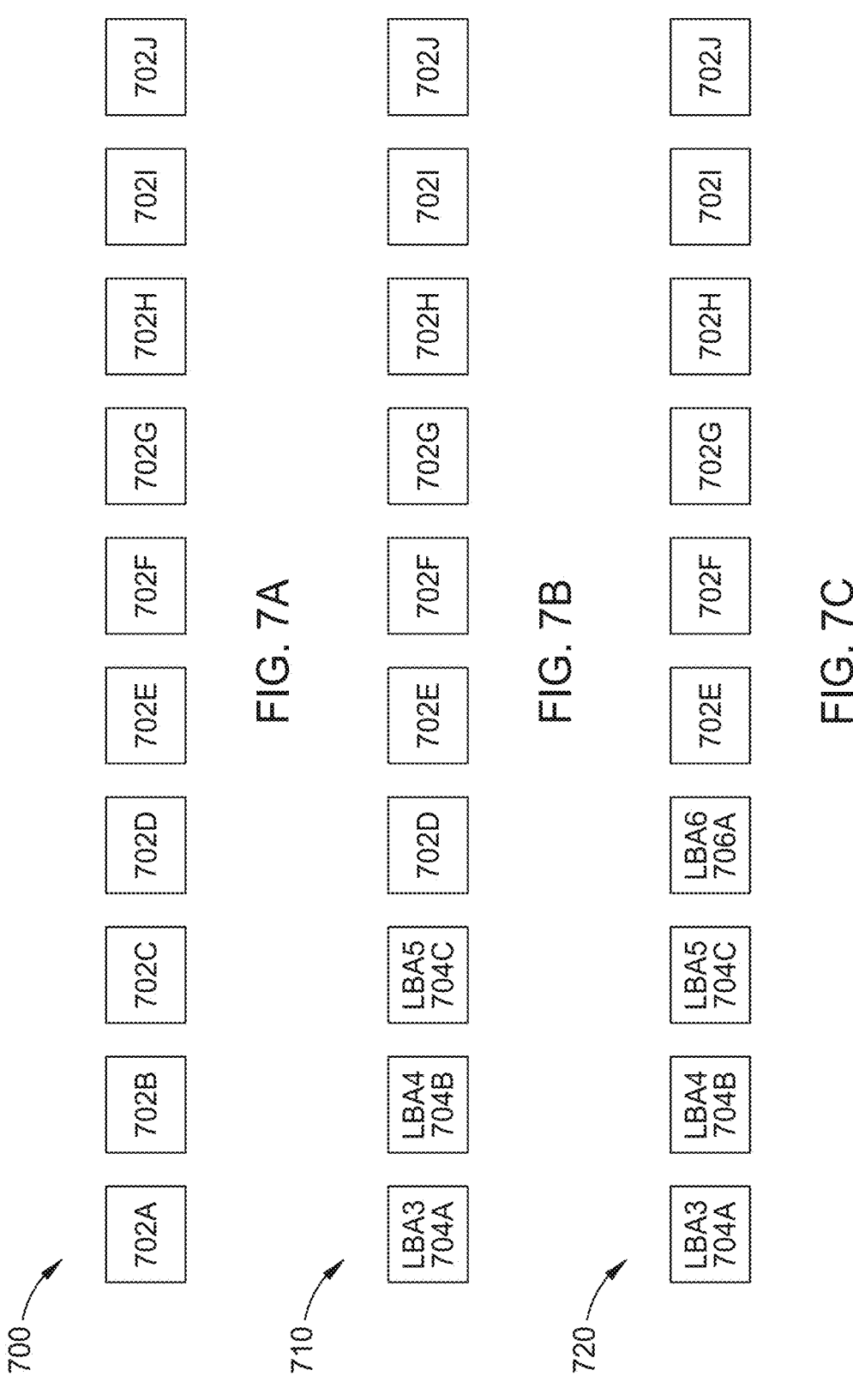
FIGS. 7A-7D are schematic illustrations of temporary buffer filling according to one embodiment.

FIGS. 7A-7D are schematic illustrations of temporary buffer filling according to one embodiment. FIGS. 7A-7D focus on a zone based with page granularity. In FIG. 7A, the illustration 700 shows the temporary buffer to have ten slots 702A-702J that are all empty with each slot 702A-702J capable of holding a single LBA. Assume for exemplification purposes that the zone of the memory device has four pages, pages 0-3. Page 0 covers LBAs 0-12; page 1 covers LBAs 13-25, page 2 covers LBAs 26-39, and page 3 covers LBAs 40-45. Also assume for exemplification purposes that there will be five commands: command A covers LBAs 3-5; command B covers LBA 6; command C covers LBAs 7-10; command D covers LBAs 11-18, and command E covers LBAs 0-2. Finally, assume commands A-E are received in the following order: A, B, C, D, and E.

Upon fetching command A covering LBAs 3-5, it is clear that command A does not start at the write pointer and command A. There is sufficient room in the temporary buffer for LBAs 3-5 because there are ten open slots 702A-702J. Additionally, there is sufficient room in the temporary buffer for LBAs 0-2. Thus, the data for command A, LBAs 3-5, is sent to the temporary buffer and stored in open slots as shown in illustration 710 in FIG. 7B where slots 702A-702C are now filled and marked as 704A-704C while slots 702D-702J remain empty. It is to be understood that alternatively, command A could be sent to a shadow SQ instead of sending the data to the temporary buffer. Command A could be sent to the shadow SQ in the scenario where there is zone based granularity without page based granularity.

Similar to command A, upon fetching command B covering LBA 6, it is clear that command B also does not start at the write pointer. There is sufficient room in in the temporary buffer for LBA 6 because there are seven open slots 702D-702J. Additionally, there is sufficient room in the temporary buffer for LBAs 0-2. Thus, the data for command B, LBA 6, is sent to the temporary buffer and stored in an open slot as shown in illustration 720 in FIG. 7C where slots 702D is now filled and marked as 706A while slots 702E-702J remain empty.

Command C presents an issue. Command C covers LBAs 7-10. Command C does not start at the write pointer, and there is sufficient room in the temporary buffer for LBAs 7-10 because there are six open slots 702E-702J. However, if LBAs 7-10 are placed in the temporary buffer such that four open slots are filled (e.g., 702E-702H) as shown in illustration 730 in FIG. 7D as filled slots marked as 708A-708B with slots 7021-702J open, there would be insufficient room for LBAs 0-2. Thus, there is insufficient room for the data of command C, and command C is sent to the shadow SQ.

Similar to command C, command D presents an issue as well. Command D covers LBAs 11-18. Command D does not start at the write pointer, and there is insufficient room in the temporary buffer for LBAs 11-18 because there are only six open slots 702E-702J as shown in FIG. 7C. Thus, there is insufficient room for the data of command D, and command D is sent to the shadow SQ.

Command E can be fetched for LBAs 0-2. Unlike commands A-D, command E does start at the write pointer for the zone, and there is sufficient room in the temporary buffer as there are three LBAs for command E and six open slots (i.e., 702E-702J) as shown in FIG. 7C. Thus, command E can be executed. Thereafter, the data for commands A and B can be written. Because commands C and D were placed in the shadow SQ, then commands C and D may be executed.

Figures 7D, 8A, 8B:
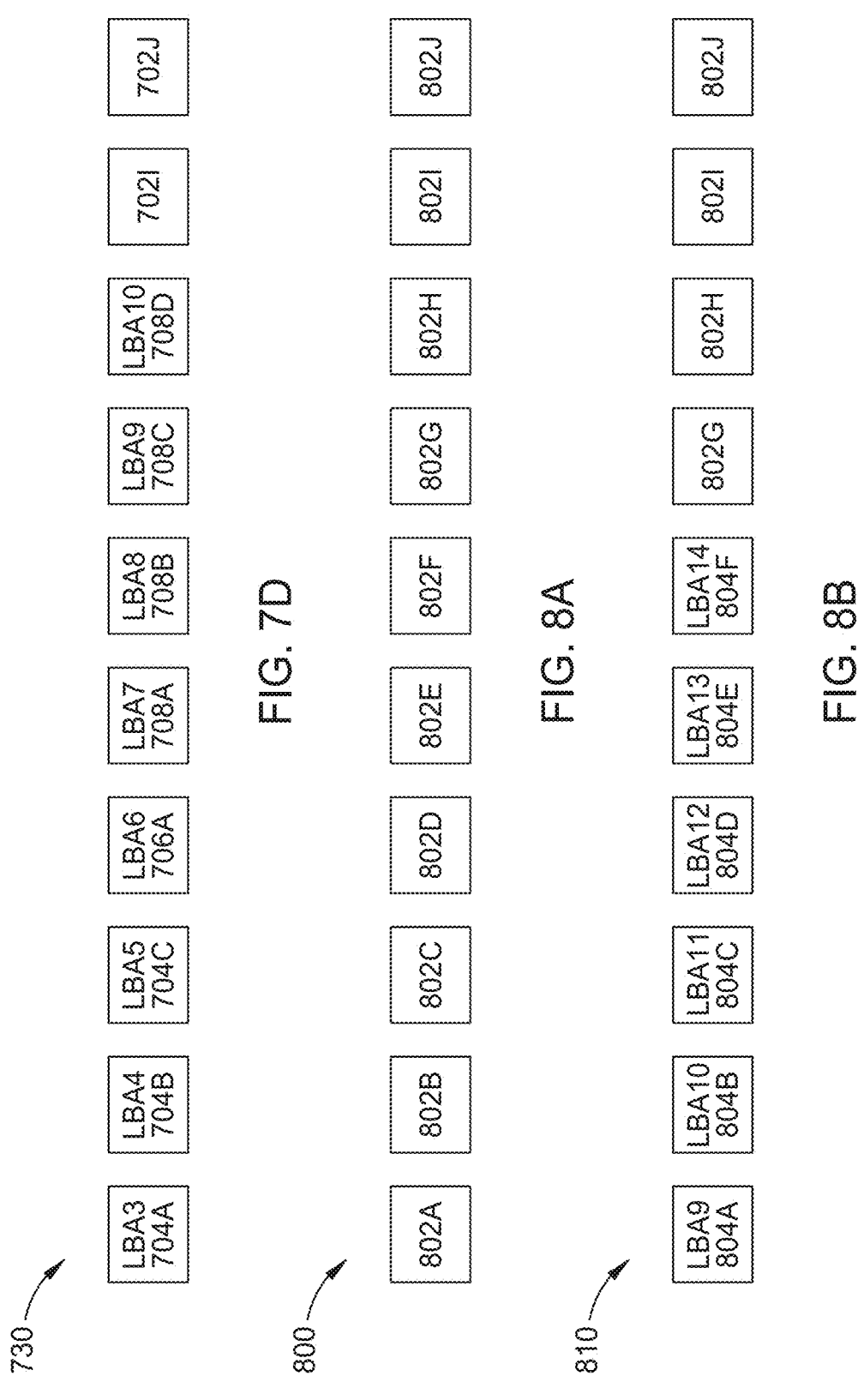
FIGS. 8A-8E are schematic illustrations of temporary buffer filling according to another embodiment.

FIGS. 8A-8E are schematic illustrations of temporary buffer filling according to another embodiment. In FIG. 8A, the illustration 800 shows the temporary buffer to have ten slots 802A-802J that are all empty with each slot 802A-802J capable of holding a single LBA. Assume for exemplification purposes that the zone of the memory device has four pages, pages 0-3. Page 0 covers LBAs 0-7; page 1 covers LBAs 8-15, page 2 covers LBAs 16-23, and page 3 covers LBAs 24-31. Also assume for exemplification purposes that there will be four commands: command A covers LBAs 0-4; command B covers LBAs 9-15; command C covers LBAs 25-27; and command D covers LBAs 5-7. Also assume commands A-D are received in the following order: A, B, C, and D.

Upon fetching command A covering LBAs 0-4, it is clear that command A does start at the write pointer for page 0. Additionally, there is sufficient room in the temporary buffer for LBAs 0-4 because there are ten open slots 802A-802J. Thus, command A is executed and slots 802A-802J will be vacant after the execution.

Upon fetching command B covering LBAs 9-14, it is clear that command B does not start at the write pointer for the zone or for any page. There is sufficient room in in the temporary buffer for LBAs 9-14 because there are still ten open slots 802A-802J. Additionally, there is sufficient room in the temporary buffer for LBAs 5-7 of page 0, and for the entire gap of LBAs 5-8. Thus, the data for command B, LBAs 9-14, is sent to the temporary buffer and stored in open slots as shown in illustration 810 in FIG. 8B where slots 802A-802F are now filled and marked as 804A-804G while slots 802H-802J remain empty.

Command C presents an issue. Command C covers LBAs 25-27. Command C does not start at the write pointer for the zone or any page, and there is sufficient room in the temporary buffer for LBAs 25-27 because there are four open slots 802G-802J. However, if LBAs 25-27 are placed in the temporary buffer such that three open slots are filled (e.g., 802G-802I), there would be insufficient room for LBAs 5-7. Thus, command C is cannot be executed and slots 802G-802I remain open as shown in illustration 820 shown in FIG. 8C. Command C is thus sent to a shadow SQ for later execution.

Figures 8C, 8D, 8E:
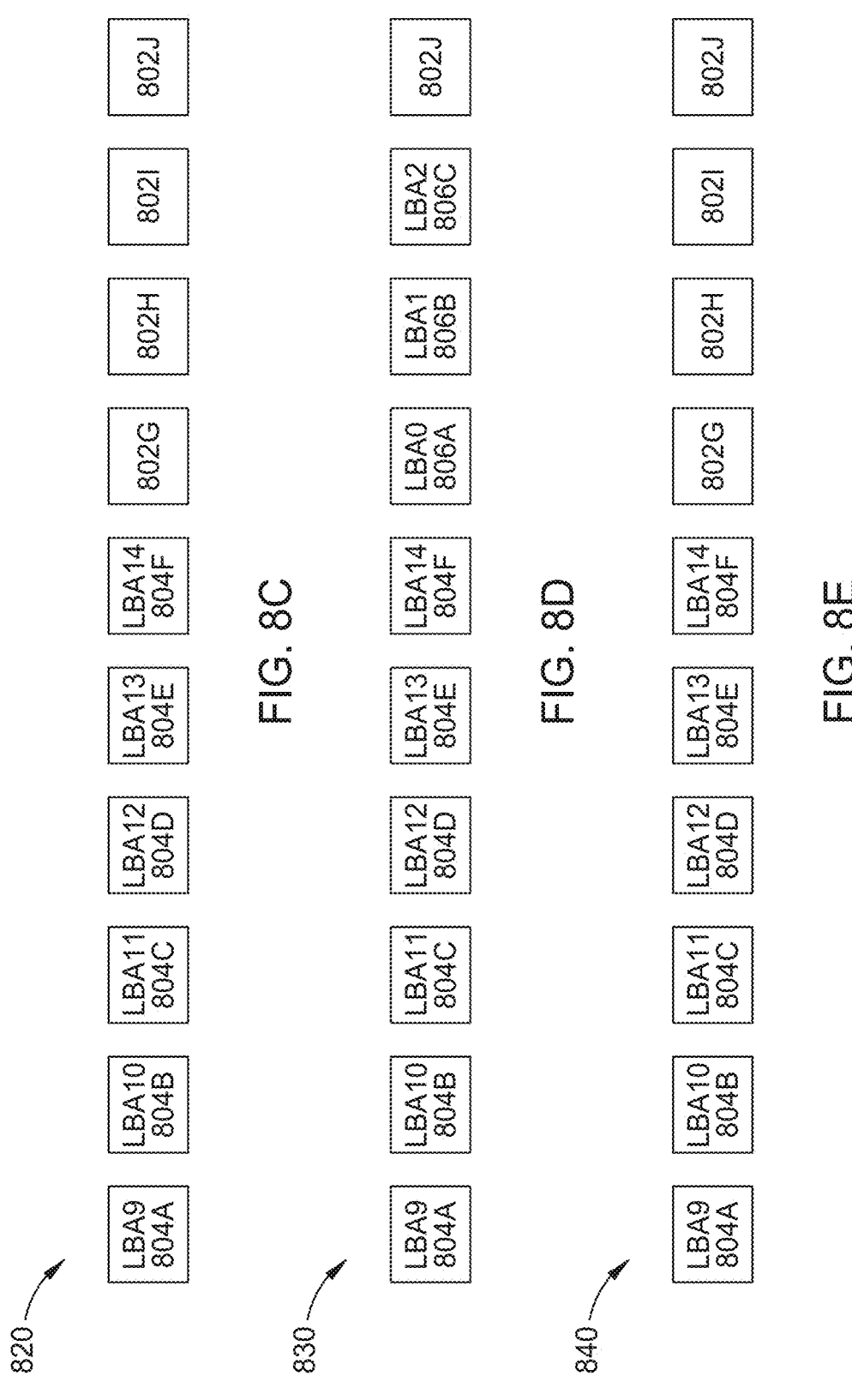

Command D can be fetched for LBAs 5-7. Command D does start at the write pointer for page 0 of the zone, and there is sufficient room in the temporary buffer as there are three LBAs for command D and four open slots (i.e., 802G-802J) as shown in FIG. 8C. Thus, command D can be executed. To execute command D, LBAs 5-7 end up in the temporary buffer in slots 802G-802I and now marked as 806A-806C in illustration 830 of FIG. 8D and are then written to page 0. LBAs 9-14 remain in the temporary buffer because LBA 8 has not been written. Slots 802G-802I are all open again as shown in illustration 840 shown in FIG. 8E.

Figure 9:
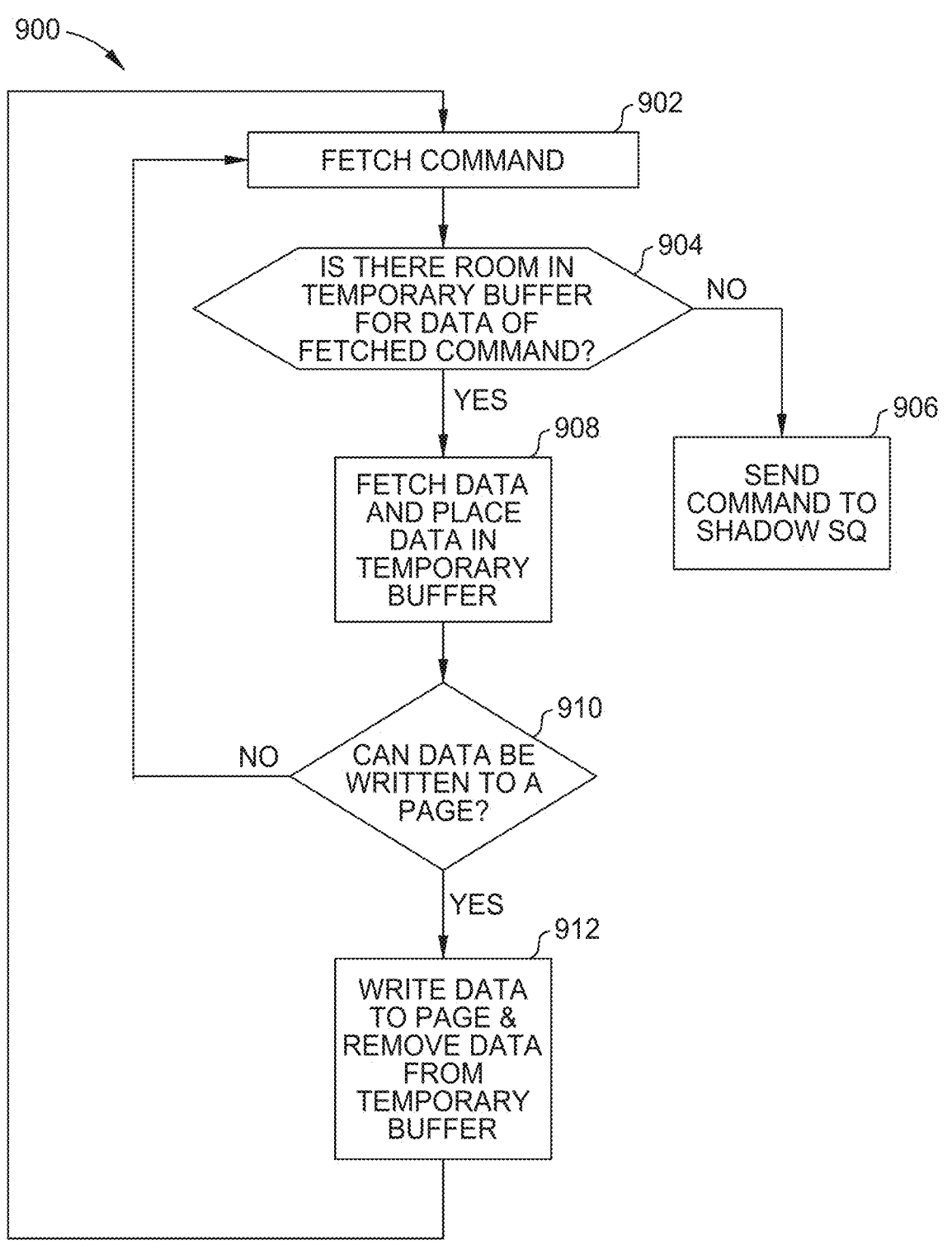
FIG. 9 is a flowchart illustrating temporary buffer management according to one embodiment.

FIG. 9 is a flowchart 900 illustrating temporary buffer management according to one embodiment. Initially, a command is fetched at block 902 followed by a determination at block 904 regarding whether there is room in a temporary buffer for data of the fetched command. If there is insufficient room in the temporary buffer, then the command is sent to the shadow SQ at block 906. If there is sufficient room in the temporary buffer, then the data is fetched and placed in the temporary buffer at block 908. A determination is then made at block 910 regarding whether the data can be written to a page at block 910. If the data cannot be written to a page, then another command is fetched at block 902 and the process repeats. If the data can be written to a page, then the data is written to a page and removed from the temporary buffer at block 912 followed by fetching another command at block 902 and repeating the process.

Figure 10:
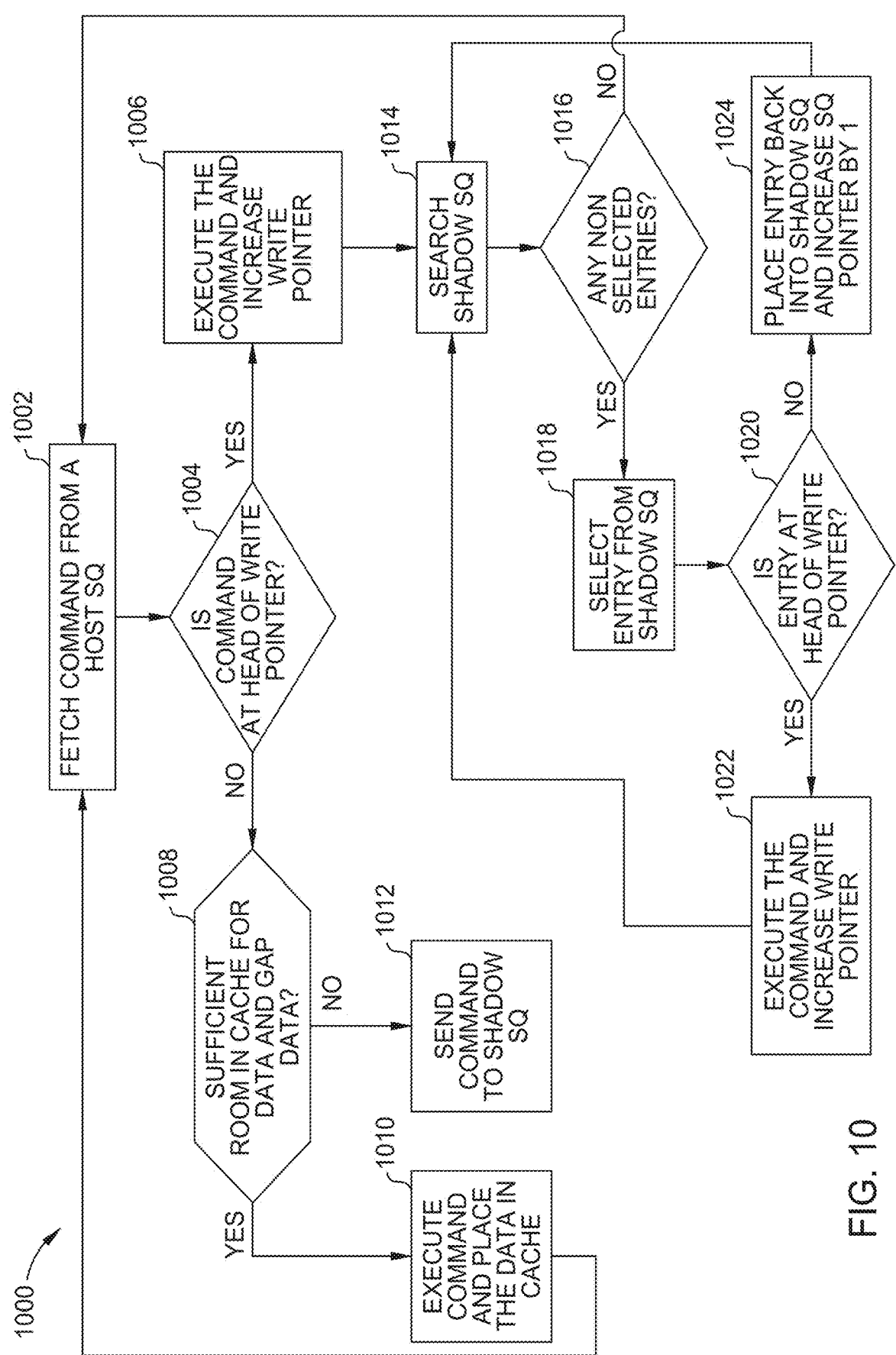
FIG. 10 is a flowchart illustrating zone management according to one embodiment.

FIG. 10 is a flowchart 1000 illustrating zone management according to one embodiment. Initially, a command is fetched from a host SQ at block 1002, and a determination is made at block 1004 regarding whether the command is at the head of a write pointer. If the command is not at the head of a write pointer, then a determination is made at block 1008 regarding whether there is sufficient room in cache or a temporary buffer for data and gap data. If there is not sufficient room in cache, the command sent to the shadow SQ at block 1012, but if there is sufficient room in cache, the command is executed and the data is placed in cache at block 1010. Thereafter, another command is fetched at block 1002 and the process repeats.

If the command is at the head of a write pointer at block 1004, then the command is executed at block 1006 and the write pointer is increased. The shadow SQ is then searched at block 1014, and a determination is made at block 1016 regarding whether there are any non-selected entries in the shadow SQ. If there are no entries to select (i.e., the shadow SQ is empty) or all entries have already been searched, then another command is fetched at block 1002 and the process repeats.

If there are any non-selected entries at block 1016, then an entry is selected from the shadow SQ at block 1018, and a determination is made at block 1020 regarding whether the selected entry is at the head of the write pointer. If the entry is not at the head of the write pointer, then the entry is placed based in the shadow SQ and the shadow pointer is increased by 1 at block 1024. Thereafter, another command is fetched at block 1002 and the process repeats.

If the entry is at the head of the write pointer at block 1020, then the command is executed and the write pointer is increased at block 1022. Thereafter, the shadow SQ is searched again at block 1014 and the process continues.

By re-ordering commands, the data storage device can provide a solution to the SWR zone model without rejecting out-of-order commands. By re-queuing commands to a SQ that is exposed to the data storage device (i.e., HMB/CMB) and is managed per-zone, the data storage device can re-order the commands at a small cost. Doing re-ordering on data might require too much memory to hold the data which is not sequential.

In one embodiment, a data storage device comprises: a memory device; and a controller coupled to the memory device, wherein the controller is configured to: fetch a first command from a first submission queue (SQ); execute the first command and adjust a write zone pointer to a head of a zone; fetch a second command from the first SQ; determine that the second command is not at the head of the zone; place the second command in a shadow SQ; fetch a third command from the first SQ; determine that the third command is at the head of the zone; execute the third command and adjust the head of the zone to a new head of the zone; fetch the second command from the shadow SQ; determine that the second command is at the new head of the zone; and execute the second command. The controller is configured to: enter pre-fetching mode; disable fetching from the first SQ; exit pre-fetching mode; and re-enable fetching from the first SQ. During pre-fetching mode, the controller is configured to fetch commands from the shadow SQ. The controller is configured to increase a shadow doorbell by 1 each time a command is placed in the shadow SQ. The controller is configured to update the shadow doorbell upon executing commands from the first SQ. The controller is configured to operate on a per page granularity. The controller is configured to determine whether there is sufficient room in cache for a command to be stored in addition to commands to fill a gap formed in a page. The controller is configured to not transfer data to cache for the command upon determining that there is insufficient space in the cache for the data of the command and data to fill the gap. The memory device has a plurality of zones, wherein each zone has a dedicated shadow SQ. The controller is configured to search the shadow SQ for commands that can be executed.

In another embodiment, a data storage device comprises: a memory device; and a controller coupled to the memory device, wherein the controller is configured to: create at least one zone within the memory device, wherein the at least one zone comprises a plurality of pages; maintain a shadow submission queue (SQ) for each zone of the at least one zone; and determine whether there is sufficient room in a temporary buffer for data corresponding to a command to be placed and for data that fills a gap of a page not associated with the command. The controller is configured to: fetch a first command; execute the first command by writing data to a first page of the plurality of pages, wherein the data occupies less than an entirety of the first page; fetch a second command; and determine that the data for the second command corresponds to a second page of the plurality of pages wherein the data for the second command is determined to occupy less than an entirety of the second page. The controller is configured to determine that the temporary buffer does not have sufficient room for both the data for the second command and data for a remainder of the first page. The controller is configured to send the second command to the shadow SQ. The controller is further configured to place the second command in the shadow SQ. The controller is configured to search the shadow SQ after executing a command. The controller is configured to re-queue a command retrieved from the shadow SQ after not executing the command.

In another embodiment, a data storage device comprises: means to store data; and a controller coupled to the means to store data, wherein the controller is configured to: reorder commands on a per zone or per page per zone basis, wherein the reordering occurs by placing commands in a shadow submission queue (SQ) dedicated and managed per zone, and wherein the reordering occurs by searching the shadow SQ after executing commands from either a host SQ or the shadow SQ and re-queueing commands in the shadow SQ not selected for execution. The controller is configured to maintain a temporary buffer for holding data corresponding to data of commands not present in the shadow SQ. The controller is configured to determine whether the temporary buffer has sufficient room to accommodate the data and any data that fills gaps in pages within a zone.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller is configured to:
    fetch a first command from a first submission queue (SQ);
    execute the first command and adjust a write zone pointer to a head of a zone;
    fetch a second command from the first SQ;
    determine that the second command is not at the head of the zone;
    place the second command in a shadow SQ;
    fetch a third command from the first SQ;
    determine that the third command is at the head of the zone;
    execute the third command and adjust the head of the zone to a new head of the zone;
    fetch the second command from the shadow SQ;
    determine that the second command is not at the new head of the zone; and
    return the second command to the shadow SQ.
2. The data storage device of claim 1, wherein the controller is configured to:
enter pre-fetching mode;
disable fetching from the first SQ;
exit pre-fetching mode; and
re-enable fetching from the first SQ.
3. The data storage device of claim 2, wherein during pre-fetching mode, the controller is configured to fetch commands from the shadow SQ.
4. The data storage device of claim 2, wherein the controller is configured to increase a shadow doorbell by 1 each time a command is placed in the shadow SQ.
5. The data storage device of claim 1, wherein the controller is configured to operate on a per page granularity.
6. The data storage device of claim 5, wherein the controller is configured to determine whether there is sufficient room in cache for a command to be stored in addition to commands to fill a gap formed in a page.
7. The data storage device of claim 6, wherein the controller is configured to not transfer data to cache for the command to be stored upon determining that there is insufficient space in the cache for the data of the command and data to fill the gap.

8. The data storage device of claim 1, wherein the memory device has a plurality of zones, wherein each zone has a dedicated shadow SQ.

9. The data storage device of claim 1, wherein the controller is configured to search the shadow SQ for commands that can be executed.

10. A data storage device, comprising:
a memory device; and
a controller coupled to the memory device, wherein the controller is configured to:
    fetch a first command from a first submission queue (SQ);
    execute the first command and adjust a write zone pointer to a head of a zone;
    fetch a second command from the first SQ;
    determine that the second command is not at the head of the zone;
    place the second command in a shadow SQ;
    fetch a third command from the first SQ;
    determine that the third command is at the head of the zone;
    execute the third command and adjust the head of the zone to a new head of the zone;
    fetch the second command from the shadow SQ;
    determine that the second command is not at the new head of the zone; and
    execute the second command, wherein the controller is configured to:
        enter pre-fetching mode;
        disable fetching from the first SQ;
        exit pre-fetching mode; and
        re-enable fetching from the first SQ, wherein the controller is configured to increase a shadow doorbell by 1 each time a command is placed in the shadow SQ, wherein the controller is configured to issue the shadow doorbell upon executing commands from the first SQ.

11. A data storage device, comprising:
a memory device; and
a controller coupled to the memory device, wherein the controller is configured to:
    create at least one zone within the memory device, wherein the at least one zone comprises a plurality of pages;
    maintain a shadow submission queue (SQ) for each zone of the at least one zone;
    determine whether there is sufficient room in a temporary buffer for data corresponding to a command to be placed and for data that fills a gap of a page not associated with the command;
    fetch a command from the shadow SQ;

determine that the command does not match a write zone pointer; and
    re-queue the command retrieved from the shadow SQ into the shadow SQ after not executing the command retrieved from the shadow SQ.

12. The data storage device of claim 11, wherein the controller is configured to:
    fetch a first command;
    execute the first command by writing data to a first page of the plurality of pages, wherein the data occupies less than an entirety of the first page;
    fetch a second command; and
    determine that the data for the second command corresponds to a second page of the plurality of pages wherein the data for the second command is determined to occupy less than an entirety of the second page.

13. The data storage device of claim 12, wherein the controller is configured to determine that the temporary buffer does not have sufficient room for both the data for the second command and data for a remainder of the first page.

14. The data storage device of claim 13, wherein the controller is configured to send the second command to the shadow SQ.

15. The data storage device of claim 12, wherein the controller is further configured to place the second command in the shadow SQ.

16. The data storage device of claim 15, wherein the controller is configured to search the shadow SQ after executing a command.

17. A data storage device, comprising:
means to store data; and
a controller coupled to the means to store data, wherein the controller is configured to reorder commands on a per zone or per page per zone basis, wherein the reordering occurs by placing commands in a shadow submission queue (SQ) dedicated and managed per zone, and wherein the reordering occurs by searching the shadow SQ after executing commands from either a host SQ or the shadow SQ, fetching commands from the shadow SQ, determining that the fetched commands do not match a write zone pointer, and re-queueing the fetched commands in the shadow SQ not selected for execution.

18. The data storage device of claim 17, wherein the controller is configured to maintain a temporary buffer for holding data corresponding to data of commands not present in the shadow SQ.

19. The data storage device of claim 18, wherein the controller is configured to determine whether the temporary buffer has sufficient room to accommodate the data corresponding to data of commands not present in the shadow SQ and any data that fills gaps in pages within a zone.

* * * * *